United States Patent [19]

Miller et al.

[11] Patent Number: 4,856,682

[45] Date of Patent: Aug. 15, 1989

[54] HOPPER AND AGITATOR ASSEMBLY FOR AN ICE DISPENSER

[75] Inventors: Benjamin D. Miller, Chicago; Thaddeus M. Jablonski, Palatine, both of Ill.

[73] Assignee: Remcor Products Company, Franklin Park, Ill.

[21] Appl. No.: 175,532

[22] Filed: Mar. 31, 1988

[51] Int. Cl.[4] .......................... G01F 11/20; B67D 5/62

[52] U.S. Cl. ................................ 222/238; 222/146.6; 222/330

[58] Field of Search .................... 222/146.6, 227, 236, 222/238, 252, 254, 271, 330, 333, 410, 482; 62/344, 381

[56] References Cited

U.S. PATENT DOCUMENTS

| | | | |
|---|---|---|---|
| 496,560 | 5/1893 | Galloway | 222/242 |
| 2,612,299 | 9/1952 | McCabe | 222/410 |
| 3,036,737 | 5/1962 | King et al. | 222/227 X |
| 3,099,369 | 7/1963 | Schatz et al. | 222/238 |
| 3,187,958 | 6/1965 | Swart | 222/227 |
| 3,393,839 | 7/1968 | Weil et al. | 222/239 |
| 4,139,126 | 2/1979 | Krasner et al. | 222/410 X |

*Primary Examiner*—Michael S. Huppert
*Attorney, Agent, or Firm*—Juettner Pyle Lloyd & Verbeck

[57] ABSTRACT

A hopper and agitator assembly for an ice dispenser is characterized by an ice storage hopper having at least two ice dispensing openings and dual rotary agitators in the hopper for urging ice bodies through the openings during dispensing operations. The agitators are mounted side by side for rotation in a common plane and have radially extending arms, the ends of which sweep past the dispensing openings. By using dual agitators, the hopper may have a length considerably greater than its width, so that even when the dispensing openings are toward opposite ends of the hopper, the ends of the agitator arms still sweep closely past the openings to efficiently urge ice through the openings.

9 Claims, 2 Drawing Sheets

HOPPER AND AGITATOR ASSEMBLY FOR AN ICE DISPENSER

BACKGROUND OF THE INVENTION

The present invention relates to an improved hopper and agitator assembly for an ice dispenser, in which a pair of side by side rotary agitators are in the hopper.

In the food and beverage service industries, it is desirable to provide means for conveniently dispensing a quantity of ice, for example into a glass to facilitate service of ice water and cold beverages to customers. The means usually comprises an ice dispenser, which for commercial applications includes a hopper for storing a quantity of crushed, cracked, flaked or cubed ice, and an icemaker for manufacturing ice for the hopper. A thermostat in the hopper in proximity to the point of entry of ice sense the level of ice and controls operation of the icemaker, and an agitator means in the hopper agitates the mass of ice. An opening in the hopper enables ice to be removed from the hopper, for example by a dispensing mechanism that is actuable to permit a flow of ice through the opening, and the agitator means is operated during dispensing to assist in urging ice bodies therethrough. The agitator means also may be operated periodically for the purpose of preventing congealing or agglomeration of ice bodies in the hopper.

Dispensing mechanisms for hoppers may be of any desired type. Several systems are known for dispensing ice in predetermined quantities. In U.S. Pat. No. 4,226,269, for example, a vertically oriented delivery chute for ice has one or more control elements that are selectively insertable into the chute to correspondingly adjust the amount of ice delivered by a concurrent opening of a lower closure member of the chute. A storage hopper for ice is located above the chute, and contains an agitator for assisting in refilling the chute.

In some cases, gate type dispensers are used to dispense ice. Such dispensers usually comprise a gate that is movable to uncover a dispensing opening in a hopper for as long as it is desired to dispense ice through the opening, usually into a chute extending downwardly to an ice outlet from the chute. One particularly advantageous gate type dispenser is disclosed in Miller et al U.S. Pat. No. 4,346,824, assigned to the assignee of the present invention.

Ice dispensers that have a single dispensing mechanism can serve only one user at a time. Where a greater service rate is required, for example to simultaneously provide ice to two or more users, two or more such dispensers must be employed, which adds considerable expense to the operation. Consequently, ice dispensers have been developed that have a plurality of dispensing stations. A hopper of such a multiple station dispenser has a corresponding plurality of discharge openings, each of which opens into an associated chute for conveying ice to a station. A dispensing mechanism is associated with each opening and chute to control a flow of ice bodies therethrough, and may be located either at the opening or at a lower end of the chute.

Conventionally, such multiple station ice dispensers have a single rotary agitator in the hopper. The agitator has radially extending arms, and during a dispensing operation is rotated to urge ice bodies in the hopper through the hopper openings to assist in deliver of ice. Advantageously, the ends of the arms sweep closely past the opening to maximize the force with which ice bodies are urged through the openings. If the hopper is of generally square cross section, the agitator may be made to have a diameter sufficiently large that the ends of its arms will sweep sufficiently close to all of the openings, even when the openings are toward opposite ends of the hopper front side. However, if size limitations imposed on the ice dispenser are such that the length of the hopper across its front is relatively large in comparison with its width from front to back, then the maximum diameter of the agitator will be limited to be no greater than the width of the hopper, and therefore much less than the length of the hopper. Under this circumstance, the ends of the agitator arms will only be able to sweep closely past any openings located medially along the hopper front wall, but not closely past any toward opposite ends of the front wall. The agitator therefore will not be able to sufficiently assist movement of ice bodies through the openings at opposite ends of the front wall, and ice will not be uniformly delivered to all of the stations.

OBJECT OF THE INVENTION

A primary object of the present invention is to provide a hopper and agitator assembly for an ice dispenser, wherein the hopper is rectangular and has a length along its front that is considerably greater than its width from front to back, at least two dispensing openings are formed through the hopper toward opposite ends of its front, and a pair of rotary agitators are located side by side in the hopper and assist movement of ice bodies uniformly through all of the openings.

SUMMARY OF THE INVENTION

In accordance with the present invention, a hopper and agitator assembly for an ice dispenser comprises a hopper for storage of a mass of particles of ice. The hopper has front, back, side and bottom walls, and at least two dispensing openings are formed through the hopper toward a lower end thereof, through which openings ice particles are delivered. A pair of agitators are mounted for rotation in the hopper toward a lower end thereof for urging ice particles through the openings.

In a preferred embodiment, the hopper has a length toward its bottom wall and between its side walls that is greater than a width of the hopper toward its bottom wall and between its front and back walls, and the pair of agitators are mounted for rotation in the hopper to opposite sides of a center of the front wall. The dispensing openings are formed through the front wall toward a lower end thereof, and the agitators are mounted side by side for rotation in a common plane. The agitators each have a plurality of radially extending arms, the ends of which arms together sweep closely past all of the dispensing openings upon rotation of the agitators to urge ice particles through the openings. The arms of each agitator are of equal length, and the ends of the arms, upon rotation of the agitators, describe paths having diameters slightly less than the width of said hopper at the level of the common plane. The at least two dispensing openings may be more than two openings formed through the front wall lower end at generally uniformly spaced intervals from one side of the front wall to the other, and the arms of each agitator sweep closely past associated ones of the openings, so that all of the openings are closely swept by the arms and ice particles in the hopper are urged uniformly through each of the openings.

In a contemplated embodiment, the ratio of the hopper length to the hopper width is at least 3:2.

Other objects, advantages and features of the invention will become apparent upon a consideration of the following detailed description, when taken in conjunction with the accompanying drawings.

DETAILED DESCRIPTION

Figure 1:
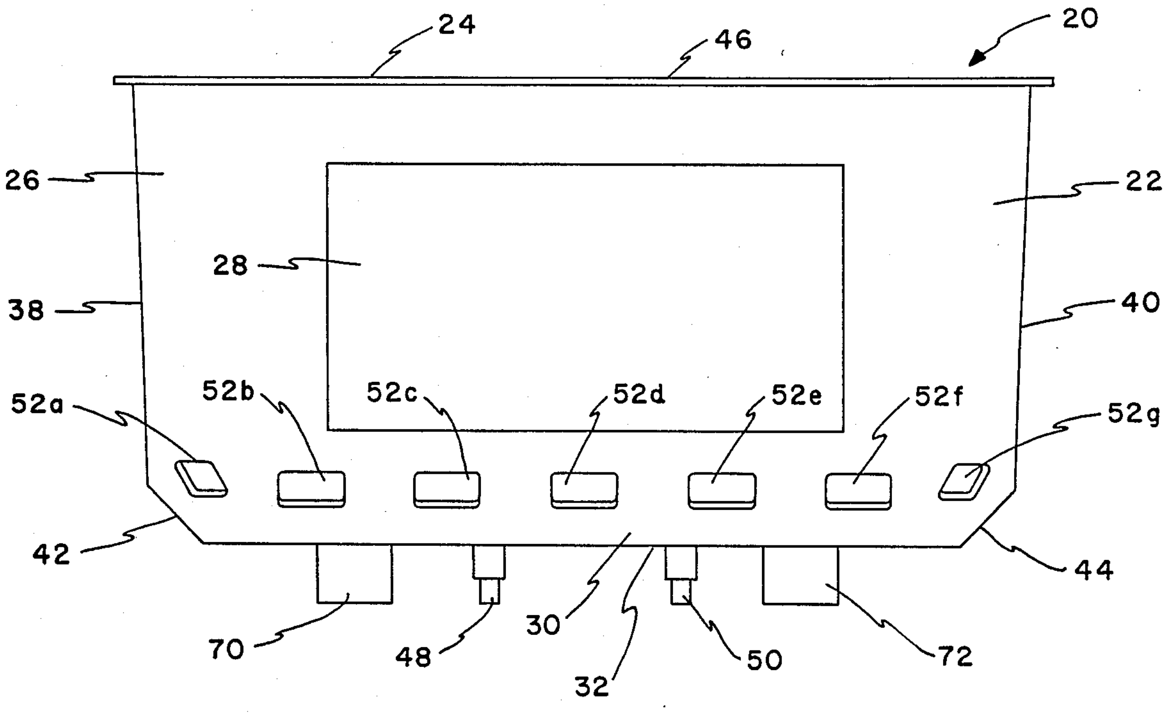
FIG. 1 is a front elevation view of the hopper and agitator assembly of the invention.

In FIG. 1 there is indicated generally at 20 a hopper and agitator assembly for an ice dispenser, of a type embodying the teachings of the invention. The assembly includes a hopper or bin for storing a large mass of crushed, cracked, flaked or cubed ice, such as 50 or more pounds of ice that may be introduced therein either manually or by an automatic icemaker through an open upper end 24 of the hopper. The hopper has a front wall 26, and a removable door 28 in the front wall provides access to the interior of the hopper. The front wall communicates at its lower end with a lower front wall portion 30 that extends rearwardly into communication with a hopper bottom wall 32. A hopper back wall 33 communicates at its lower end with a medial back wall portion 34 that extends forwardly to a lower back wall portion 36, which lower back wall portion extends forwardly into communication with the bottom wall.

Figure 2:
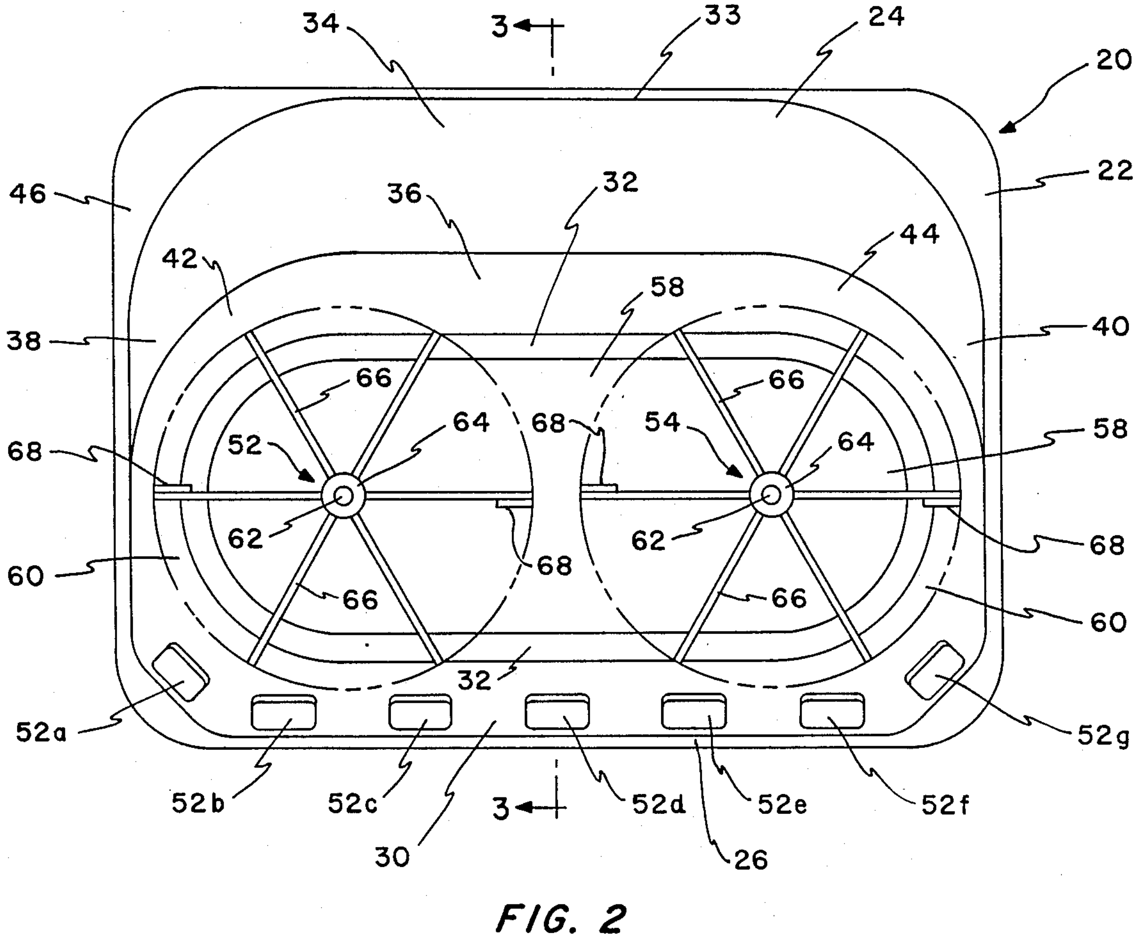
FIG. 2 is a top plan view of the hopper and agitator assembly.

Referring also to FIG. 2, in addition to front and back walls, the hopper 22 also has opposite side walls 38 and 40 that extend downwardly to curved lower side wall portions 42 and 44 that connect with the bottom wall 32 and with the lower front and back wall portions 30 and 36, thereby forming a generally closed interior of the hopper. A lip 46 extends radially outwardly from and circumferentially around upper ends of the front, back and side walls, and is adapted to support the hopper when it is placed within a cabinet. A pair of drain lines 48 and 50 from the bottom wall to carry melt water out of the hopper.

To accommodate dispensing of ice bodies from the hopper 22, a plurality of dispensing openings 52*a*–g are formed through and along the lower front wall portion 30. The dispensing openings may be uniformly spaced one from the other, and each is adapted to communicate with an upper end of a downwardly extending associated chute (not shown), the lower end of which chute is at an ice delivery location. Although also not shown, in use of the hopper in an ice dispenser a plurality of dispensing mechanisms would be provided for controlling a flow of ice bodies through the openings 52*a*–g and their associated chutes. Each dispensing mechanism could be located either at its associated opening to selectively open and close the opening, or at the bottom of its associated chute to open and close a passage through the chute. Although seven dispensing openings 52*a*–g are shown, more or less may be provided.

The hopper 22 is adapted to accommodate a plurality of discharge openings 52*a*–g through its lower front wall portion 30, while at the same time have a relatively limited width from front to back, so that the cabinet in which it is carried does not require a deep shelf for mounting. Consequently, and as best seen in FIG. 2, the length of the lower end of the hopper in the direction along the hopper front wall and between the lower side wall portions 42 and 44 is considerably greater than the width of the lower end of the hopper between the lower front and back wall portions 30 and 36. For the hopper as illustrated, its length to width ratio toward its bottom is on the order of about 2:1. Thus, if as conventional a single rotary agitator were provided within the hopper, the diameter of the agitator could be no greater than about the width of the hopper lower end between the lower front and back wall portions 30 and 36, and therefore considerably less than and only about one-half the length of the hopper lower end between the lower side wall portions 42 and 44. Upon rotation of such a single agitator, radially extending arms of the agitator would therefore sweep closely past only a limited number of the discharge openings 52*a*–g, for example only closely past those generally medially located in the hopper front wall if the agitator axis of rotation were at the center of the hopper. In consequence, the agitator would not urge ice pieces uniformly through all of the discharge openings, and perhaps not at all through the openings toward opposite sides of the hopper. Ice pieces therefore would not be delivered uniformly to all of the dispensing stations.

Figure 3:
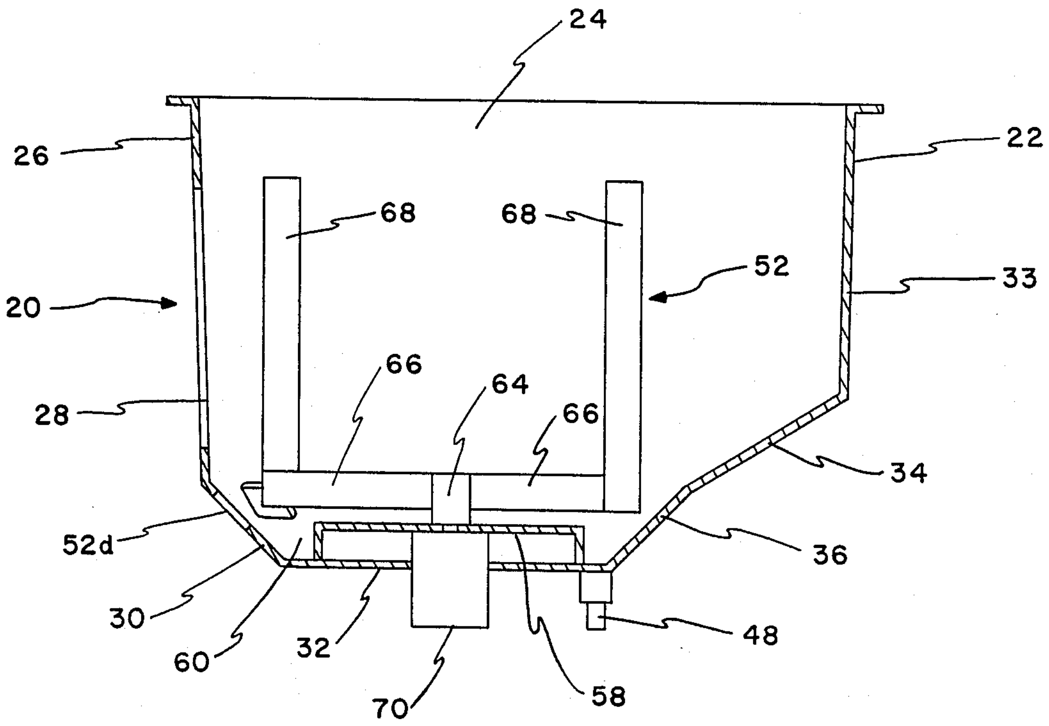
FIG. 3 is a cross sectional side elevation view, taken substantially along the lines 3—3 of FIG. 2.

Accordingly, to accommodate uniform urging of ice pieces through all of the discharge openings 52*a*–g, the invention contemplates that a pair of rotary agitators or impellers, indicated generally at 52 and 54, be within the hopper 22. As also seen in FIG. 3, an upstanding housing 58 on the hopper bottom wall 32 defines with the hopper a trough 60 extending below and along the discharge openings, and each agitator includes a rotatable shaft 62 that extends vertically in liquid sealed passage through the housing. Hubs 64 of the agitators are secured to upper ends of the shafts for rotation therewith, and a plurality of arms 66 extend radially outwardly from each hub. For the embodiment shown each agitator has six arms equally spaced at 60° apart, and each also has, at outer ends of a pair of diametrically opposed arms, a pair of upstanding paddles 68. To rotate the agitators within the hopper, lower ends of the shafts may be driven by respective gear motors 70 and 72 mounted on the hopper bottom wall 32. In the alternative, only one of the agitators may be rotated by a gear motor, while the other is driven by a gear box coupled to the motor.

The agitators 52 and 54 are mounted for rotation on opposite sides of the hopper 22, and their arms 66 are of uniform length and rotate in a common horizontal plane just above the housing 58. The lengths of the arms are selected so that paths described by their outer ends are of diameters just slightly less than the spacing between the lower front and rear wall portions 30 and 36 at the level of the arms within the hopper, and the agitators are located so that the ends of the arms move closely past the lower curved side wall portions 42 and 44.

Because two agitators are provided in the hopper, each having a maximum diameter, all of the discharge openings 52*a*–g are closely swept by ends of the agitator arms 66. The ends of the arms of the agitator 52 sweep very closely past the discharge openings 52*a*–c, the ends of the arms of the agitator 54 sweep very closely past the discharge openings 54*e*–g, while the ends of the arms of both agitators sweep relatively closely past the center discharge opening 52*d*. Ice bodies in the hopper 22 are therefore urged uniformly through all of the discharge openings 52*a*–g.

Advantageously, the agitators are each given the same direction of rotation. During rotation, while the arms 66 agitate ice in the lower portion of the hopper and urge ice pieces uniformly through the discharge openings 52*a*–g, the upstanding paddles 68 agitate the main body of ice in the upper portion of the hopper, whereby congealing and agglomeration of the mass of ice in the hopper is prevented.

Although as illustrated and described, the paths of the ends of the agitator arms 66 are separate, depending upon the dimensions of the hopper and the size of agitators thay may be accommodated in the hopper, the paths may overlap. In that case, rotation of the agitators would be synchronized so that their respective arms 66 do not engage one another.

While one embodiment of the invention has been described in detail, various modifications and other embodiments thereof may be devised by one skilled in the art without departing from the spirit and scope of the invention, as defined in the appended claims.

What is claimed is:

1. A hopper and agitator assembly for an ice dispenser, said assembly comprising a hopper for storage of a mass of particles of ice and having generally straight and back walls, a bottom wall and curved side walls and at least three dispensing openings above said bottom wall and in generally horizontal alignment through a lower end of said front wall through which ice particles are delivered; and a pair of agitators mounted side by side for rotation in said hopper in a generally horizontal plane and generally at the level of said dispensing openings for urging ice particles through said openings, each said agitator having a plurality of radially extending arms the ends of which sweep closely past and follow an associated one of said curved side walls and sweep closely past at least an associated one of said dispensing openings in said front wall upon rotation of said agitators, at least one of said dispensing openings in said front wall being located generally intermediate the axes of rotation of said agitators.

2. An assembly as in claim 1, wherein said hopper at the level of said agitators has a length between said side walls that is greater than its width between said front and back walls, said pair of agitators are mounted for rotation in said hopper to opposite sides of the center of said front wall, and one of said dispensing openings is at the center of said front wall.

3. An assembly as in claim 2, wherein said arms of each said agitator are of equal length and ends of said arms, upon rotation of said agitators, describe paths having diameters slightly less than the width of said hopper at the level of said common plane.

4. As assembly as in claim 3, wherein said at least three dispensing openings comprise at least three openings formed through said front wall and at least one opening in each said side wall at the level of said front wall openings, and said arms of each said agitator sweep closely past associated ones of said openings, such that all of said openings are closely swept by said arms and ice particles in said hopper are urged uniformly through each of said openings.

5. An assembly as in claim 3, including means for rotating each said agitator in the same direction of rotation.

6. An assembly as in claim 5, wherein said rotating means comprises a pair of motor means, each for rotating an associated one of said agitators.

7. An assembly as in claim 5, wherein said rotating means comprises a motor means, and means coupling said agitators to said motor means for synchronized rotation thereby.

8. An assembly as in claim 2, wherein the ratio of said hopper length to said hopper width is at least 3:2.

9. An assembly as in claim 2, wherein the ratio of said hopper length to said hopper width is at least 2:1.

* * * * *